(12) United States Patent
Walters

(10) Patent No.: US 10,212,767 B2
(45) Date of Patent: Feb. 19, 2019

(54) CONSTANT CURRENT POWER DRIVER CIRCUIT FOR AUTOMOTIVE LIGHT ASSEMBLY

(71) Applicant: Autosystems America Inc., Plymouth, MI (US)

(72) Inventor: Richard J. Walters, Ann Arbor, MI (US)

(73) Assignee: AUTOSYSTEMS AMERICA INC., Plymouth, MI (US)

( * ) Notice: Subject to any disclaimer, the term of this patent is extended or adjusted under 35 U.S.C. 154(b) by 0 days.

(21) Appl. No.: 15/844,727

(22) Filed: Dec. 18, 2017

(65) Prior Publication Data

US 2018/0184491 A1    Jun. 28, 2018

Related U.S. Application Data

(60) Provisional application No. 62/437,809, filed on Dec. 22, 2016.

(51) Int. Cl.

| | |
|---|---|
| *H05B 33/08* | (2006.01) |
| *B60Q 1/18* | (2006.01) |
| *B60Q 1/44* | (2006.01) |
| *B60Q 1/30* | (2006.01) |
| *B60Q 1/00* | (2006.01) |
| *B60Q 1/14* | (2006.01) |
| *B60Q 1/26* | (2006.01) |
| *B60Q 11/00* | (2006.01) |

(52) U.S. Cl.
CPC ....... *H05B 33/0812* (2013.01); *B60Q 1/0017* (2013.01); *B60Q 1/1407* (2013.01); *B60Q 1/18* (2013.01); *B60Q 1/2696* (2013.01); *B60Q 1/30* (2013.01); *B60Q 1/44* (2013.01); *B60Q 11/005* (2013.01); *H05B 33/083* (2013.01); *H05B 33/089* (2013.01)

(58) Field of Classification Search
None
See application file for complete search history.

(56) References Cited

U.S. PATENT DOCUMENTS

| | | | |
|---|---|---|---|
| 6,414,437 B1 * | 7/2002 | Diez | B60Q 1/1407 307/10.8 |
| 2014/0159576 A1 * | 6/2014 | Marchesin | H05B 33/0827 315/77 |

* cited by examiner

*Primary Examiner* — Jany Richardson
(74) *Attorney, Agent, or Firm* — Harness, Dickey & Pierce, P.L.C.

(57) ABSTRACT

A constant current driver circuit is provided for a vehicle light assembly having a plurality of light strings arranged in parallel with each other. Each light string in the plurality of light strings includes at least one light emitting diode (LED) electrically coupled in series with an LED driver. The driver circuit includes a bias circuit, a voltage regulator circuit and a sense circuit. The bias circuit is electrically coupled to each LED driver at a common node and, in absence of a trigger signal, operates to supply a bias voltage to each LED driver. The voltage regulator circuit is electrically coupled to the common node and regulates the bias voltage supplied by the bias circuit. The sense circuit is configured to detect on/off state of the voltage regulator and, in response to detecting an off state for the voltage regulator, provides a trigger signal to the bias circuit.

23 Claims, 4 Drawing Sheets

CONSTANT CURRENT POWER DRIVER CIRCUIT FOR AUTOMOTIVE LIGHT ASSEMBLY

CROSS-REFERENCE TO RELATED APPLICATIONS

This application claims the benefit of U.S. Provisional Patent Application No. 62/437,809 filed Dec. 22, 2016, the contents of which are incorporated herein in their entirety.

FIELD

The present disclosure relates to a constant current driver circuit which may be used in the vehicle light assembly.

BACKGROUND

Automobiles and other motorized vehicles employ different types of light assemblies, including headlamps, warning lamps, and signaling lamps. Rather than relying on a single bulb, light assemblies are beginning to rely on a plurality of light emitting diodes (LEDs) to generate the light emitted by these assemblies. For safety purposes, it is important that the light produced by such light assemblies remain bright. If one or more of the LEDs is faulty, vehicle manufactures typically mandate that all of the LEDs cease producing light, thereby disabling the light assembly.

Therefore, it is desirable to provide a driver circuit that implements the one out all out feature required by a vehicle light assembly. It is also desirable that the light produced by such light assemblies maintain the same intensity across a range of supply voltages which are commonly experienced in a vehicle.

This section provides background information related to the present disclosure which is not necessarily prior art.

SUMMARY

This section provides a general summary of the disclosure, and is not a comprehensive disclosure of its full scope or all of its features.

A constant current driver circuit is provided for a vehicle light assembly having a plurality of light strings arranged in parallel with each other. Each light string in the plurality of light strings is electrically coupled between a supply voltage and ground. Each light string in the plurality of light strings further includes at least one light emitting diode (LED) electrically coupled in series with an LED driver. The driver circuit includes a bias circuit, a voltage regulator circuit and a sense circuit. The bias circuit is electrically coupled to each LED driver at a common node and, in absence of a trigger signal, operates to supply a bias voltage to each LED driver. The voltage regulator circuit is electrically coupled to the common node and regulates the bias voltage supplied by the bias circuit. The sense circuit is configured to detect on/off state of the voltage regulator and, in response to detecting an off state for the voltage regulator, provides a trigger signal to the bias circuit.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
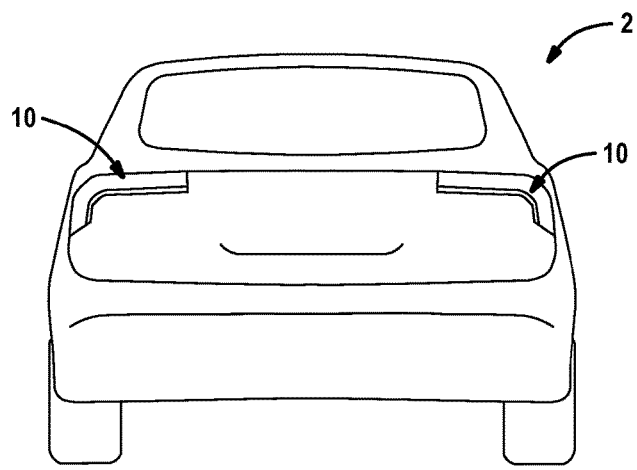
FIG. 1 is a diagram of a vehicle having one or more vehicle light assemblies.

FIG. 1 depicts a vehicle 2 having a vehicle light assembly 10 as shown. The vehicle light assembly 10 produces light using a plurality of light emitting diodes (LEDs). The light emitting diodes 13 may be white or more preferably correspond to the desired external appearance of the assembly, such as yellow, orange or red. Additionally, the strength of the light emitting diodes 13 may range from below 1 lumen to 1000 lumen. However, it is to be understood that the strength of the light emitting diodes 13 may also exceed this range in other applications. As shown, the vehicle light assembly 10 functions as a taillight assembly for the vehicle 2, but it is to be understood that the concepts set forth in this disclosure are equally applicable to other lamp assemblies, such as a headlight or turn indicator.

Figure 2:
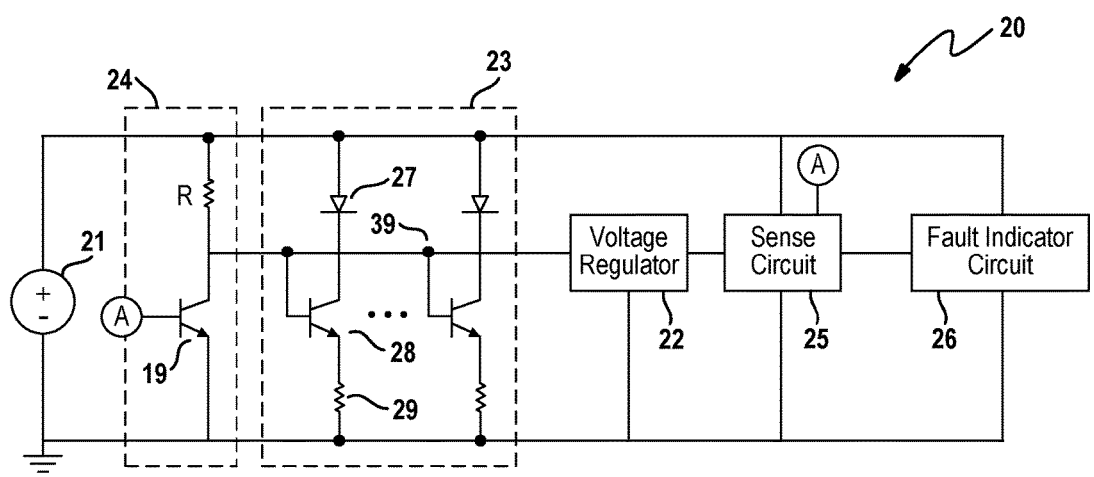
FIG. 2 is a diagram depicting a constant current power driver circuit which may be used in a light assembly of a vehicle.

FIG. 2 depicts a constant current driver circuit 20 which may be used in the vehicle light assembly 10. The constant current driver circuit 20 is comprised of a supply voltage 21, a voltage regulator circuit 22, a bias circuit 24, a sense circuit 25 and a plurality of light strings 23 arranged in parallel with each other. The constant current driver circuit 20 may also include a fault indicator circuit 26. In an example embodiment, the supply voltage 21 is provided by the vehicle battery. It is to be understood that only the relevant components of the circuit are discussed in relation to FIG. 2, but that other circuit components may be needed to operate the light assembly 10.

Each light string in the plurality of light strings 23 is electrically coupled between the supply voltage 21 and ground. Each light string in the plurality of light strings 23 includes at least one light emitting diode (LED) 27 electrically coupled in series with an LED driver 28. In one embodiment, the LED driver is implemented by a transistor. More specifically, each transistor may be further defined as a bipolar junction transistor having a collector coupled directly to a cathode terminal of the corresponding LED and an emitter connected via a resistor 29 to ground. While reference is made to a bipolar junction transistor, other types of transistors (e.g., FETs) as well as other types of electronic switches fall within the broader aspects of this disclosure. It is also envisioned that other types of LED drivers may be used in place of the transistor.

The bias circuit 24 is electrically coupled between the supply voltage and ground and arranged in parallel with the plurality of light strings 23. For control purposes, the bias circuit 24 is also electrically coupled to each LED driver. In the absence of a trigger signal, the bias circuit 24 operates to supply a bias voltage to each LED driver 28. In response to the bias voltage, each LED driver 28 sources current through the corresponding LED 27. Conversely, in the presence of a trigger signal, the bias circuit 24 ceases to supply the bias voltage to the LED drivers 28 and current is no longer sourced through the LEDs 27. In one embodiment, the bias circuit 24 includes a transistor 19 having a collector terminal electrically coupled at a common node 39 to each LED driver 28. Other arrangements for the bias circuit 24 are also contemplated by this disclosure.

The voltage regulator circuit 22 regulates the bias voltage supplied by the bias circuit 24 to each of the LED drivers 28. To do so, the voltage regulator circuit 22 is electrically coupled to each LED driver 28 at the common node 39. In an example embodiment, the voltage regulator 22 is implemented by a Zener diode as further described below. For further details regarding an exemplary voltage regulator, reference may be had to the data sheet for the TLVH431, TLVH432 low-voltage adjustable voltage reference commercially available from Texas Instruments. Other types of voltage regulators fall within the scope of this disclosure.

In this case of a vehicle battery, the supply voltage may vary between 8 to 26 volts, for example. During normal operation, the voltage regulator circuit 22 remains on and maintains the bias voltage at a substantially constant value over a range of supply voltages (e.g., 8 to 17 volts). By maintaining a constant bias voltage, the voltage regulator 22 also ensures that the magnitude of the drive current through each of the LEDs 27 also remains substantially constant over the range of supply voltages.

In response to fault condition (i.e., an open circuit) in any one of the LEDs 27, the voltage regulator circuit 22 turns off. The sense circuit 25 is configured to detect on/off state of the voltage regulator 22. Upon detecting an off state for the voltage regulator 22, the sense circuit 25 provides the trigger signal to the bias circuit 24. In response to the trigger signal, the bias circuit 24 ceases to supply the bias voltage to the LED drivers 28 which causes the LED drivers 28 to turn off and thereby the LEDs 27 are turned off. In this way, rather than having a diminished light source, all of the LEDs 27 are turned off in the event one LEDs fails.

The fault indicator circuit 26 is interfaced with the sense circuit 26. Upon detecting an off state for the voltage regulator 22, the fault indicator circuit 25 outputs a signal indicative of a fault condition. The output signal from the fault indicator circuit 26 may be received and subsequently processed, for example by an electronic control unit (not shown) residing in the vehicle.

Figure 3:
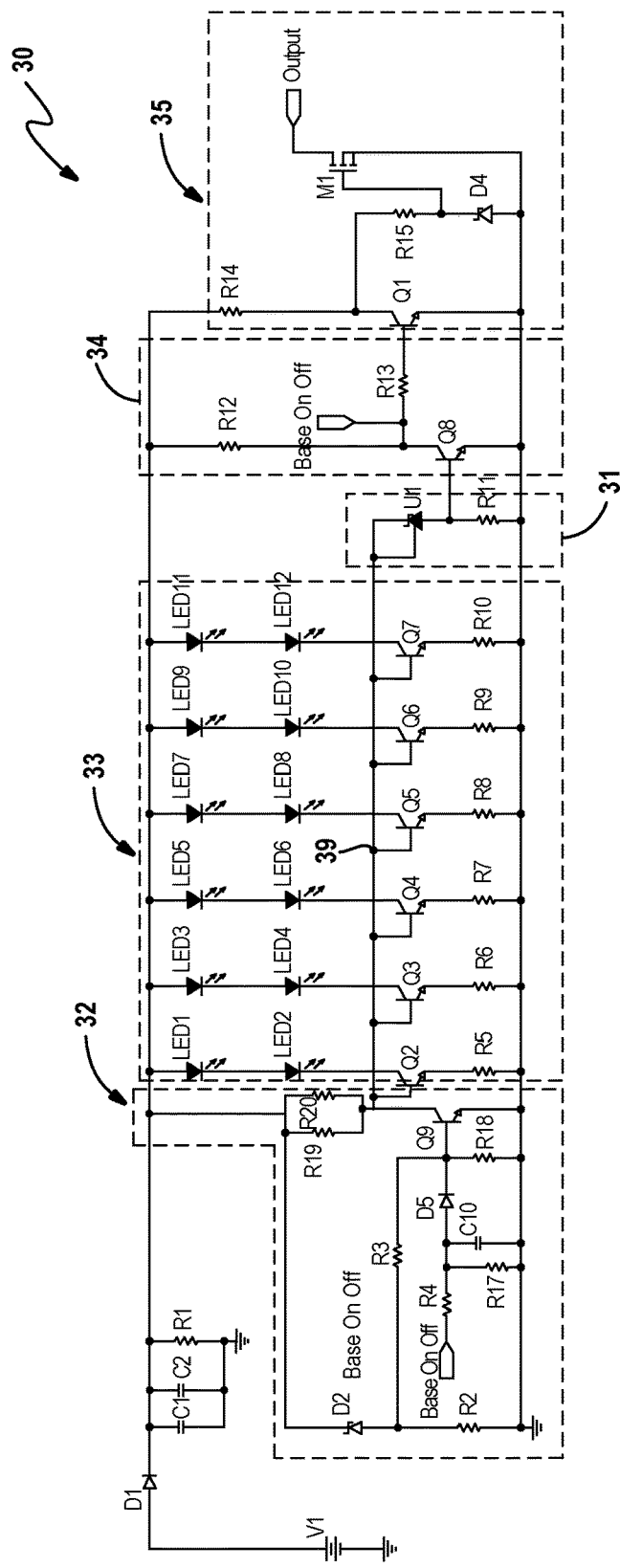
FIG. 3 is a schematic of an example embodiment of the constant current driver circuit.

FIG. 3 further illustrates an example embodiment of a constant current driver circuit 30 which may be used in the vehicle light assembly 10. The constant current driver circuit 30 includes a voltage regulator 31, a bias circuit 32, and a plurality of light strings 33 arranged in parallel with each other. The supply voltage for the constant current driver circuit 30 is provided by a vehicle battery V1. More specifically, six light strings are arranged in parallel although more or less strings are contemplated. Three of the strings are mounted on an upper circuit board; whereas, the other three strings are mounted on a lower circuit board. It is noted that increasing the number of light strings does not require additional control circuitry.

Each light string in the plurality of light strings 33 is electrically coupled between the supply voltage V1 and ground. In the example embodiment, each light string includes two light emitting diodes (LED) electrically coupled in series. A capacitor may be coupled in parallel across the two LEDs. Each light string further includes a bipolar junction transistor and a resistor. For example, a first light string is comprised of light emitting diodes LED1 and LED2, transistor Q2 and resistor R5. The collector of transistor Q2 is coupled directly to a cathode terminal of light emitting diode LED2 and the emitter of transistor Q2 is coupled directly to a terminal of resistor R5. The other light strings are arranged in a similar manner.

The bias circuit 32 is electrically coupled between the supply voltage V1 and ground and is arranged in parallel with each light string in the plurality of light strings 33. In the example embodiment, the bias circuit 32 includes a bipolar junction transistor Q9. In the example embodiment, the control terminals for each transistor Q2-Q7 in the plurality of light strings are electrically coupled together at a control node 39. The collector of transistor Q9 is also coupled to the control node 39.

During normal operation, this transistor Q9 is off and thus a bias current is supplied through resistors R19, R20 to the control terminals of the transistors Q2-Q7 in the plurality of light strings 33. As a result, the transistors Q2-Q7 are turned on and current is sourced through the LEDs in each light string. During a fault condition, the control terminal (i.e., base) of the transistor Q9 receives a control signal from the sense circuit 34 as further described below. The transistor Q9 turns on and acts as a current sink for the current from the supply voltage V1. When Q9 is on, the bias current supplied to the transistors Q2-Q7 in the plurality of light strings 33 is diverted and the transistors Q2-Q7 turn off.

The bias circuit 32 also includes an overvoltage feature. During normal operation, diode D2 blocks current flow to the control terminal of transistor Q9 and thus this transistor remains off. For example, the diode D2 blocks current below a cutoff value, for example 16 volts. The supply voltage V1, however, can vary within a range of supply voltages (e.g., 8 to 26 volts). When the supply voltage is above the cutoff value, D2 reverse conducts and current flows to the control terminal of transistor Q9 and thereby biases the transistor on. In the example embodiment, transistor Q9 is designed to turn on over 16V although this cutoff value can easily be adjusted to any voltage by changing the value of diode D2.

In the example embodiment, the voltage regulator circuit 31 is comprised of a precision voltage reference diode U1. The cathode terminal of the precision voltage reference diode U1 is electrically coupled to the control node 39 and the anode terminal of the precision voltage reference diode U1 is electrically coupled via resistor R11 to ground.

The sense circuit 34 includes a secondary transistor Q8 which generate the control signal for the bias circuit 32. In particular, the control terminal of the secondary transistor Q8 is electrically coupled to the anode terminal of the precision voltage reference diode U1 while the collector and emitter are electrically coupled between the supply voltage and ground, respectively.

The sense circuit 34 may optionally provide the control signal to a fault indicator circuit 35. In the example embodiment, fault indicator circuit 35 includes two additional transistors Q1 and M1. The control terminal of transistor Q1 is electrically coupled to the collector of the secondary transistor Q8 with the collector and emitter of transistor Q1 electrically coupled between the supply voltage and ground, respectively. The output at the emitter of transistor Q1 serves as the control signal for the FET M1.

Figure 4:
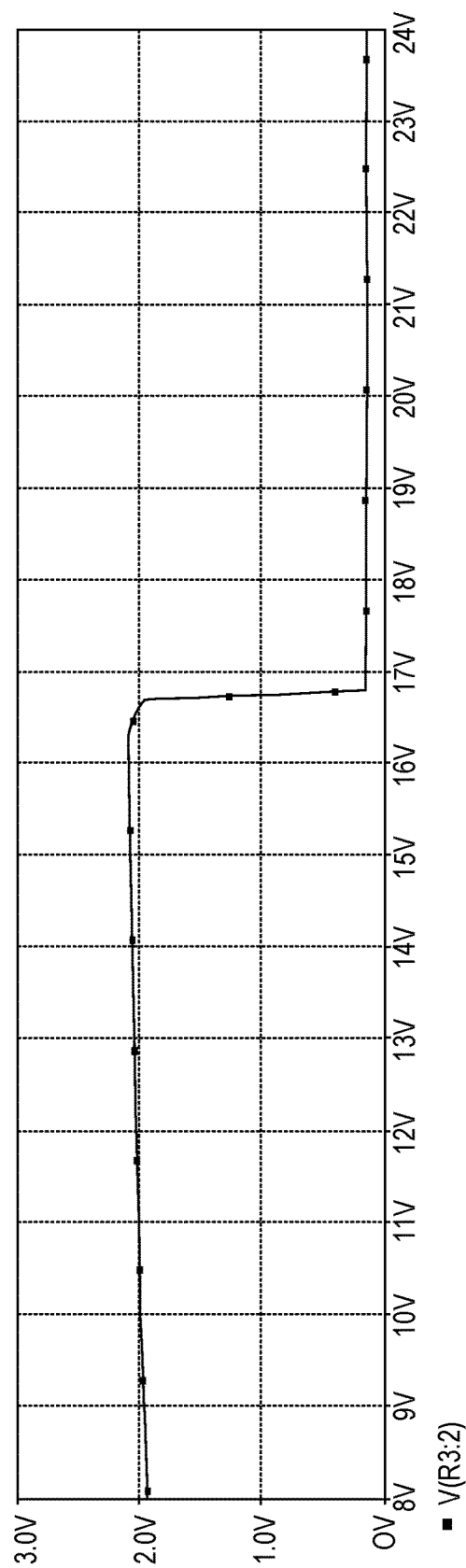
FIG. 4 is a graph illustrating the bias voltage applied to transistors in each string of lights over a range of supply voltages.

During normal operating conditions, the precision voltage reference diode U1 is on and regulates the bias voltage supplied to the bases of the transistors Q2-Q7 in the plurality of light strings 33. In the case of a vehicle battery, the supply voltage V1 may vary between 8 to 26 volts during normal operating conditions. In this example, the bias voltage for transistors Q2-Q7 is about 2 volts and remains substantially constant over a range of supply voltages as seen in FIG. 4. With the precision voltage reference diode U1 turned on, there is enough current flowing through resistor R11 to provide a voltage to the base of the secondary transistor Q8 to turn it on. It follows that the base of transistor Q1 is pulled low which in turn keeps the base of the transistor Q9 in the bias circuit 32 pulled low and turned off.

Figure 5:
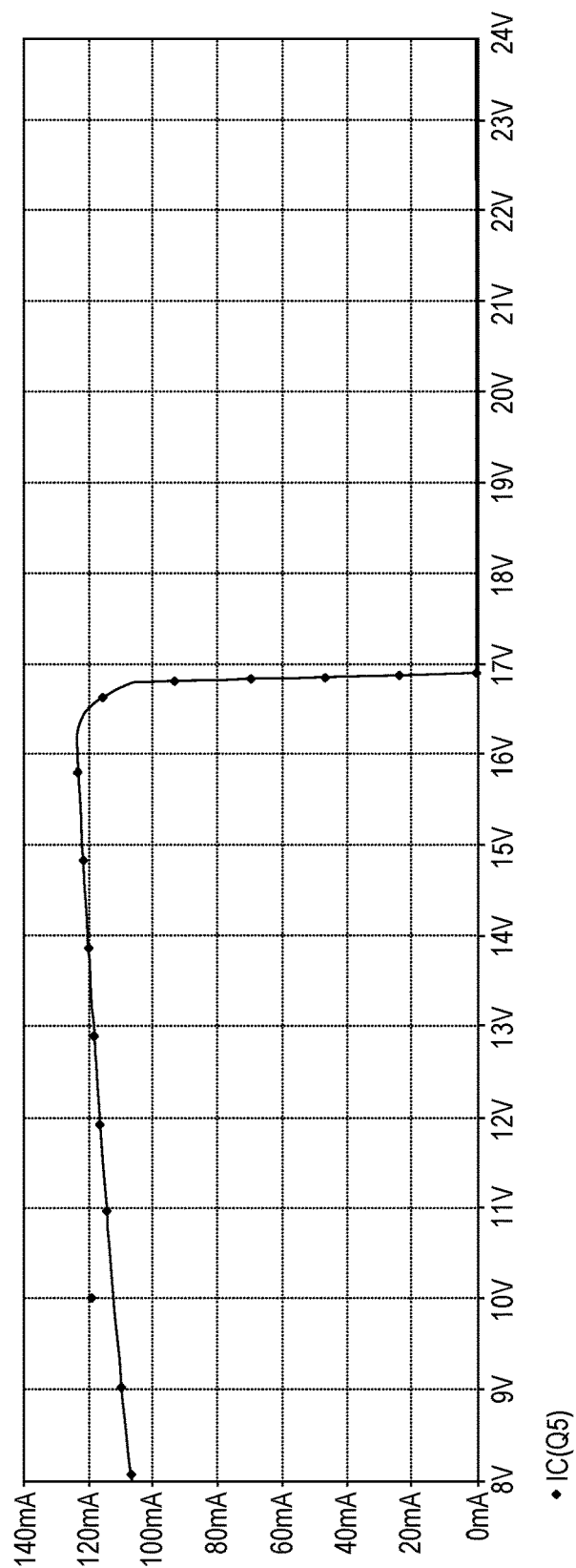
FIG. 5 is a graph illustrating the current output from any one of the string of lights over a range of supply voltages.

In response to the regulated supply voltage, the transistors Q2-Q7 in the plurality of light strings turn on which causes the LEDs in each of the plurality of light strings 33 to turn on. By maintaining the bias voltage constant, the voltage regulator circuit 31 also ensures that the magnitude of the drive current through each of the LEDs 27 remains substantially constant over the range of supply voltages. FIG. 5 shows the current output by any one of the light strings over a battery range of 8 to 26 volts. At 13V, there is about 116 mA current per LED string. At 8V, there is about 107 mA current per LED string. This current at low voltage conditions is more than suitable to meet any stop-start design requirement. The current is intended to shut off at about 17V as there are typically no requirements from vehicle manufacturers for light output from 16V to 26V.

When one or more LEDs experience a fault condition (e.g., an open circuit), the driver circuit 30 is designed to turn off all of the LEDs and thereby prevent a dimmed light. During a fault condition, the precision voltage reference diode U1 turns off due to insufficient voltage to remain in regulation. If any string opens up (e.g. an open circuit LED), that particular string will no longer provide voltage or current to the collector of its corresponding driver (i.e., transistors Q2-Q7). That driver now becomes a simple diode (base to emitter) and is forward biased, thereby causing a lower voltage (approximate 0.7V to ground) to be distributed across the LED drivers. At this point, the lower voltage (0.7V) is not sufficient to keep the 1.4V precision voltage reference diode U1 in operation, so it turns off. As a result, the voltage at the base of the secondary transistor Q8 drops and this transistor turns off. Voltage at the collector of the secondary transistor Q8 then floats high and serves as the control signal for the transistor Q9 in the bias circuit 32. When the transistor Q9 in the bias circuit 32 turns on, voltage at the base of the transistors Q2-Q7 in the plurality of light strings 33 is driven low and all of the transistors Q2-Q7 are turned off concurrently. In this way, all of the LEDs are turned off at the same time. It is noted that this function is accomplished on low power side and not from opening the high current path directly as was done in conventional approaches.

Turning on the transistor Q9 also triggers a change in the fault indicator circuit 35. In the example embodiment, the output of the fault indicator circuit 35 is low during normal operating conditions. When a fault occurs and secondary transistor Q8 turns off, transistor Q1 is turned on which in turn forces FET M1 to turn off. The output of the fault detection circuit 34 is at the drain of FET M1 and goes high (i.e., indicative of the fault condition) when transistor Q1 is turned on.

While exemplary embodiments of the constant current driver circuit have been described above with specific components having specific values and arranged in a specific configuration, it will be appreciated that these systems may be constructed with many different configurations, components, and/or values as necessary or desired for a particular application. The above configurations, components and values are presented only to describe one particular embodiment that has proven effective and should be viewed as illustrating, rather than limiting.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

What is claimed is:

1. A constant current driver circuit for a vehicle light assembly, comprising:
   a plurality of light strings arranged in parallel with each other, each light string in the plurality of light strings is electrically coupled between a supply voltage and ground, each light string in the plurality of light strings includes at least one light emitting diode (LED) electrically coupled in series with an LED driver;
   a bias circuit is electrically coupled to each LED driver at a common node, wherein the bias circuit is configured to receive a trigger signal and, in absence of a trigger signal, operates to supply a bias voltage to each LED driver;
   a voltage regulator circuit electrically coupled to the common node and regulates the bias voltage supplied by the bias circuit; and
   a sense circuit configured to detect on/off state of the voltage regulator and, in response to detecting an off state for the voltage regulator, provides a trigger signal to the bias circuit.

2. The constant current driver circuit of claim 1 wherein the voltage regulator circuit includes a Zener diode having a cathode terminal coupled directly to the common node and an anode terminal connected via a resistor to ground.

3. The constant current driver circuit of claim 1 wherein the voltage regulator circuit maintains the bias voltage at a substantially constant value over a range of different supply voltages.

4. The constant current driver circuit of claim 1 wherein the LED driver is implemented by a transistor.

5. The constant current driver circuit of claim 4 wherein the transistor in each of the plurality of light strings is further defined as a bipolar junction transistor having a collector coupled directly to a cathode terminal of the corresponding LED and an emitter connected via a resistor to ground.

6. The constant current driver circuit of claim 1 wherein, in the presence of the trigger signal, the bias circuit removes the bias voltage from each LED driver.

7. The constant current driver circuit of claim 1 wherein the bias circuit includes a transistor having a control terminal configured to receive the trigger signal from the sense circuit and a collector terminal electrically coupled to the common node, wherein the transistor turns on in response to the trigger signal from the sense circuit.

8. The constant current driver circuit of claim 1 further comprises a fault indicator circuit interfaced with the sense circuit and, in response to the trigger signal, operates to output a signal indicative of a fault condition.

9. The constant current driver circuit of claim 1 wherein the constant current driver circuit is integrated into a light assembly of a vehicle.

10. A constant current driver circuit for a vehicle light assembly, comprising:
    a plurality of light strings arranged in parallel with each other, each light string in the plurality of light strings is electrically coupled between a supply voltage and ground, each light string in the plurality of light strings includes at least one light emitting diode (LED) electrically coupled in series with a transistor;
    a bias circuit electrically coupled between the supply voltage and ground and arranged in parallel with each light string in the plurality of light strings;
    a voltage regulator circuit electrically coupled to a control terminal of each transistor in the plurality of light strings and regulates a bias voltage supplied by the bias circuit to the transistors in the plurality of light strings; and
    a sense circuit configured to detect on/off state of the voltage regulator circuit and, in response to detecting an off state for the voltage regulator circuit, provides a trigger signal to the bias circuit, wherein the bias circuit supplies a bias voltage to a control terminal of each transistor in the plurality of light strings in absence of the trigger signal, and ceases to supply of the bias voltage to a control terminal of each transistor in the plurality of light strings in presence of the trigger signal.

11. The constant current driver circuit of claim 10 wherein the voltage regulator circuit includes a Zener diode having a cathode terminal coupled at a common node to each transistor in the plurality of light strings and an anode terminal connected via a resistor to ground.

12. The constant current driver circuit of claim 11 wherein the voltage regulator circuit maintains the bias voltage at a substantially constant value over a range of different supply voltages.

13. The constant current driver circuit of claim 12 wherein the transistor in each of the plurality of light strings is further defined as a bipolar junction transistor having a collector coupled directly to a cathode terminal of the corresponding LED and an emitter connected via a resistor to ground.

14. The constant current driver circuit of claim 13 wherein the bias circuit includes a transistor having a control terminal configured to receive the trigger signal from the sense circuit and a collector terminal electrically coupled to the common node, wherein the transistor turns on in response to the trigger signal from the sense circuit.

15. The constant current power supply circuit of claim 14 further comprises a fault indicator circuit interfaced with the sense circuit and, in response to the trigger signal, operates to output a signal indicative of a fault condition.

16. The constant current driver circuit of claim 10 is integrated into a light assembly of a vehicle.

17. A constant current driver circuit for a vehicle light assembly, comprising:
    a plurality of light strings arranged in parallel with each other, each light string in the plurality of light strings is electrically coupled between a supply voltage and ground, each light string in the plurality of light strings includes at least one light emitting diode (LED) electrically coupled in series with a transistor;
    a bias circuit electrically coupled to each transistor in the plurality of light strings at a common node;
    a voltage regulator circuit electrically coupled to the common node, wherein the voltage regulator circuit in an on state regulates a bias voltage supplied by the bias circuit and switches to an off state in response to an open circuit across any one of the LEDs in the plurality of light strings; and
    a sense circuit configured to detect on/off state of the voltage regulator circuit and, in response to detecting an off state for the voltage regulator circuit, provides a trigger signal to the bias circuit, wherein the bias circuit supplies a bias voltage to a control terminal of each transistor in the plurality of light strings in absence of the trigger signal and, in response to the trigger signal, ceases to supply of the bias voltage.

18. The constant current driver circuit of claim 17 wherein the voltage regulator circuit includes a Zener diode having a cathode terminal coupled at the common node and an anode terminal connected via a resistor to ground.

19. The constant current driver circuit of claim 17 wherein the voltage regulator circuit maintains the bias voltage at a substantially constant value over a range of different supply voltages.

20. The constant current driver circuit of claim 17 wherein the transistor in each of the plurality of light strings is further defined as a bipolar junction transistor having a collector coupled directed to a cathode terminal of the corresponding LED and an emitter connected via a resistor to ground.

21. The constant current driver circuit of claim 17 wherein the bias circuit includes a transistor having a control terminal configured to receive the trigger signal from the sense circuit and a collector terminal electrically coupled to the common node, wherein the transistor turns on in response to the trigger signal from the sense circuit.

22. The constant current power supply circuit of claim 17 further comprises a fault indicator circuit interfaced with the sense circuit and, in response to the trigger signal, operates to output a signal indicative of a fault condition.

23. The constant current driver circuit of claim 17 is integrated into a light assembly of a vehicle.

* * * * *